United States Patent [19]

Mercier

[11] Patent Number: 5,580,539
[45] Date of Patent: Dec. 3, 1996

[54] PROCESS FOR MAKING ALUMINA AGGLOMERATES

[75] Inventor: Marc Mercier, Ales, France

[73] Assignee: Rhone-Poulenc Chimie, Courbevoie Cedex, France

[21] Appl. No.: 234,631

[22] Filed: Apr. 28, 1994

Related U.S. Application Data

[63] Continuation of Ser. No. 128,272, Sep. 29, 1993, abandoned, which is a continuation of Ser. No. 384,635, Jul. 25, 1989, abandoned.

[30] Foreign Application Priority Data

Jul. 29, 1988 [FR] France ................................. 88 10248

[51] Int. Cl.$^6$ ........................................................ C01F 7/02
[52] U.S. Cl. .............................................. 423/626; 423/628
[58] Field of Search ................................... 423/626, 628; 23/313 R

[56] References Cited

U.S. PATENT DOCUMENTS

| | | | |
|---|---|---|---|
| 2,881,051 | 4/1959 | Pingard | 23/313 |
| 3,264,069 | 8/1966 | Getty | 42/628 |
| 3,317,277 | 5/1967 | Cosgrove | 23/313 |
| 3,353,910 | 11/1967 | Cornelius et al. | 423/628 |
| 3,411,878 | 11/1968 | Granlier et al. | 423/626 |
| 3,480,389 | 11/1969 | Granlier | 423/626 |
| 3,628,914 | 12/1971 | Granlier | 423/628 |
| 3,928,236 | 12/1975 | Rigge et al. | 423/631 |
| 3,997,476 | 12/1976 | Cull | 423/626 |
| 4,344,928 | 8/1982 | Dupin et al. | 423/626 |
| 5,244,648 | 9/1993 | Dupin et al. | 423/628 |

FOREIGN PATENT DOCUMENTS

| | | |
|---|---|---|
| 1153353 | 9/1983 | Canada. |
| 1383076 | 4/1965 | France. |
| 1438497 | 4/1966 | France. |

*Primary Examiner*—Steven Bos
*Attorney, Agent, or Firm*—Burns, Doane, Swecker & Mathis, L.L.P.

[57] ABSTRACT

Alumina agglomerates having controlled porosity and excellent mechanical properties, well suited as catalyst supports and adsorbents, are produced by (a) agglomerating an alumina powder prepared by rapidly dehydrating an aluminum hydroxide, (b) aging the agglomerates thus formed in an atmosphere of controlled humidity, (c) impregnating such aged agglomerates with a solution of at least one acid, (d) hydrothermally treating the thus impregnated agglomerates in a confined enclosure, and then (e) drying and calcining the agglomerates thus treated.

17 Claims, 1 Drawing Sheet

PROCESS FOR MAKING ALUMINA AGGLOMERATES

This application is a continuation of application Ser. No. 08/128,272, filed Sep. 29, 1993, now abandoned, which is a continuation of application Ser. No. 07/384,635, filed Jul. 25, 1989, now abandoned.

BACKGROUND OF THE INVENTION

1. Field of the Invention

The present invention relates to novel active alumina agglomerates and to a process for the production of such novel agglomerates.

This invention more especially relates to novel porous active alumina agglomerates having a bimodal type of pore distribution.

2. Description of the Prior Art

It is known to this art that porous alumina agglomerates have highly desirable mechanical properties. These agglomerates find applications in various adsorption processes, but are used primarily in the field of catalysis. Indeed, heterogeneous catalysis often requires the use of catalyst supports having a large active specific surface area, on the order of several hundreds of square meters per gram, and having a high porosity, provided by pores with diameters on the order of several tens to several hundreds of Angstroms.

Furthermore, in order to facilitate fluid exchange and to improve the diffusion of fluids into the active volume of the catalyst support, processes for the preparation of alumina agglomerates having two types of pores have been proposed to this art. Such agglomerates have, on the one hand, pores with dimensions less than 1,000 Å and constituting a microporous component, and, on the other, pores with dimensions of greater than 1,000 Å which constitute a macroporous component.

Macroporosity permits a more rapid and easier exchange between the external medium and the compounds comprising the catalyst, while the microporosity assures the activity of the catalyst.

FR 1,386,364 describes the preparation of alumina agglomerates having great mechanical strength. According to this '364 patent, the process entails treating the active alumina agglomerates in an autoclave in the presence of water, and then drying and calcining the resulting products at a predetermined temperature in order to provide the desired specific surface area and particular pore dimensions.

It is also possible to improve the mechanical strength of the agglomerates by treating them in an autoclave in the presence of an acid, as described in U.S. Pat. Nos. 3,628,914 and 3,480,389.

FR 1,383,076 describes a process for preparing alumina agglomerates having a controlled porosity with a high crush strength and resistance to attrition. This process includes impregnating the porous active alumina in granular form, produced by dehydrating alumina hydrates in a flowstream of hot gases, with such amount of water as is necessary to fill the pores of the alumina, and then shaping, aging and reactivation of the agglomerates. Prior to shaping, a material such as naphthalene may be added, which disappears completely during heating, in particular during the heating for purposes of reactivation, to create the pores having large dimensions (macroporosity).

To reinforce the strength of the material, FR 2,496,631 proposes treating the agglomerates by subjecting them to a hydrothermal treatment in a confined space, in the presence of an acid.

In this manner, the resulting agglomerates are impregnated with an acid solution and are maintained at a certain temperature in a confined space.

This hydrothermal treatment in the presence of an acid makes it possible to reinforce the mechanical properties of the agglomerates, but presents the major disadvantage of disrupting the pore distribution of the treated agglomerates, in particular by causing the at least partial disappearance of the macroporosity.

SUMMARY OF THE INVENTION

Accordingly, a major object of the present invention is the provision of novel alumina agglomerates having a controlled porosity, more particularly displaying both microporosity and macroporosity, and also having remarkably high mechanical properties, such as, for example, notable enhanced crush strength and resistance to attrition vis-a-vis the aforedescribed prior art materials.

Briefly, the present invention features the preparation of alumina agglomerates preferably having controlled bimodal porosity, comprising shaping an alumina body by the agglomeration of an alumina powder produced by the rapid dehydration of an aluminum hydroxide, next aging such shaped article of alumina by maintaining it in an atmosphere of controlled humidity, and then impregnating the aged article with a solution of one or more acids and hydrothermally treating the impregnated shaped article in a confined environment. The shaped articles produced in this manner are ultimately dried and reactivated by calcination.

DETAILED DESCRIPTION OF THE PREFERRED EMBODIMENTS OF THE INVENTION

Figure 1:
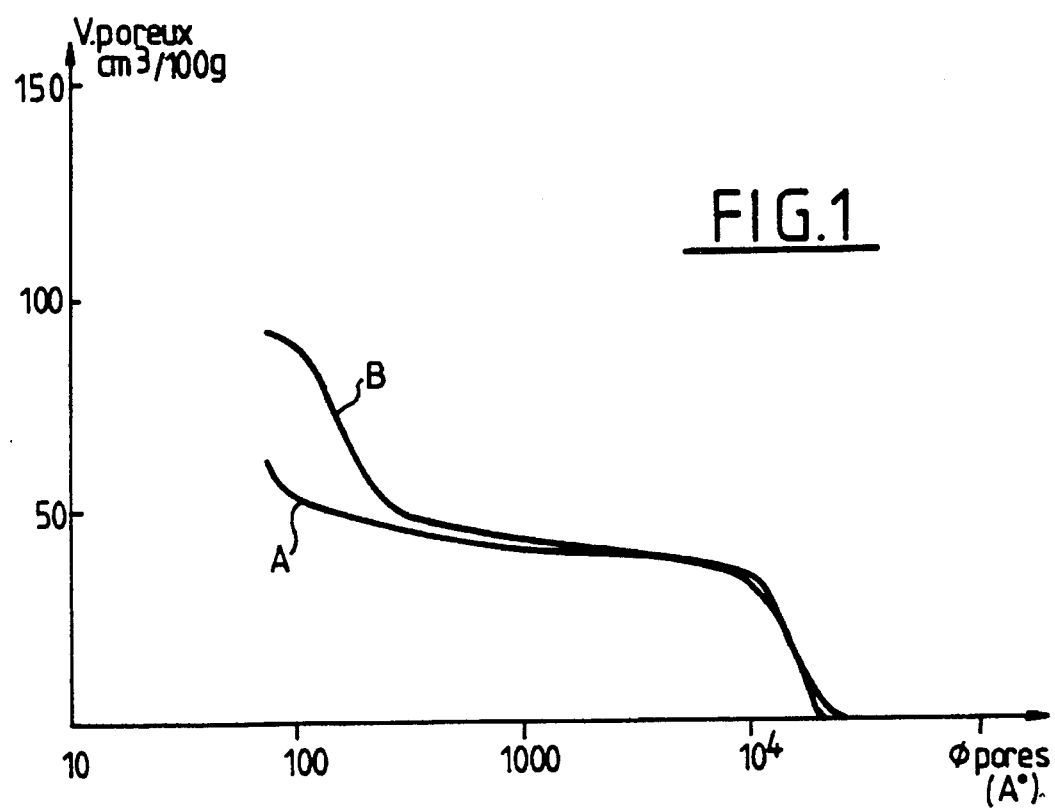
FIG. 1 is a graph plotting the pore diameters of the alumina of Example 1, in Angstroms, versus the pore volume thereof (pore distribution)

More particularly according to the present invention, it has now unexpectedly and surprisingly been determined that impregnation of the aged shaped articles with an acid solution, without any prior reactivation thereof, maintains and preserves the nature of the pore volume of the alumina shaped articles produced initially by agglomeration.

Thus, if the shaped articles of alumina agglomerates have a bimodal pore distribution, which is advantageous for catalyst applications, this bimodal distribution is preserved during the entire treatment. The agglomerates resulting after the drying and calcination therefore have the same pore distribution, advantageously the same volume of pores having dimensions less than 1,000 Å, designated the micropores, and the same volume of pores having dimensions greater than 1,000 Å, designated the macropores.

The invention thus permits the production of agglomerates having controlled dimensions and controlled distribution of the pores. The dimensions and the distribution of the pores are selected as functions of the desired end application and are created during the agglomeration stage.

Thus, the microporosity corresponding to the porosity of the starting material alumina powder is determined by the selection of the particular alumina used and, therefore, by the conditions employed during the preparation of the alumina.

With specific respect to macroporosity, it may be created by different techniques, such as the choice of the grain size distribution of the beginning alumina powder, or the agglomeration of different alumina powders having differing grain size distributions. Another technique frequently employed comprises mixing the alumina powder with a particular compound, designated a porogenic agent, which completely disappears during heating, thereby imparting a certain macroporosity to the agglomerates.

Exemplary such porogenic compounds are wood flour, charcoal, sulfur, tar, plastics or plastic emulsions, such as polyvinyl chloride, polyvinyl alcohols, naphthalene, and the like.

The amount of porogenic agent added is not critical and is determined by the macropores volume desired.

Thus, to produce the typical macropore volumes (pores larger than 1,000 Å), i.e., on the order of 0.10 cm³/g to 0.80 cm³/g, 0 to 25% by weight of the porogenic material, such as wood flour for example, are added.

In one preferred embodiment of the invention, the aged alumina shaped articles are dried at a moderate temperature to eliminate the water present in the pores. However, this drying does not eliminate the bound water of the alumina.

Preferably, the temperature of the drying of the aged agglomerates is less than about 200° C.

During this drying stage, the porogenic compound may be decomposed.

Over the course of the aging of the agglomerates in an atmosphere of controlled humidity, the crystalline phase of the alumina designated boehmite is developed. The conditions for such aging are determined by the proportion of the boehmite that is desired in the final product.

For example, the aging of the alumina agglomerates may be carried out at a temperature ranging from 30° to 100° C., in an atmosphere of saturated humidity. The aging time typically varies from several hours to several tens of hours.

The aged and optionally dried agglomerates are then impregnated with a solution of one acid or a solution of more than one acid, and then subjected to a hydrothermal treatment in a confined enclosure.

This hydrothermal treatment is generally designated "autoclavage in an acid medium", and is described, in particular, in FR 1,449,904 and 2,496,631.

It is carried out at a temperature higher than 80° C., preferably ranging from 150° to 250° C. for the duration of time preferably ranging from several minutes to 36 hours.

In another preferred embodiment of the invention, the temperature of the hydrothermal treatment ranges from 120° to 220° C. for a time period of from 15 min to 18 hours.

This hydrothermal treatment enables the conversion of at least a fraction of the alumina into boehmite. It may be carried out either under a vapor pressure of saturation, or under a partial water vapor pressure equal to at least 70% of the saturation vapor pressure corresponding to the temperature of the treatment.

The impregnation of the alumina agglomerates with the acid solution may be carried out either by immersing them in the acid solution prior to being introduced into the autoclave, for a period of time sufficient for the acid to diffuse into the pores of the alumina, or without previous impregnation, the acidity in this case being imparted by the liquid in the autoclave.

Exemplary acid solutions suitable for use according to the invention include aqueous solutions of nitric acid, hydrochloric acid, perchloric acid, sulfuric acid, or of weaker acids, such as acetic acid in a solution having a pH less than about 4, or a mixture of acids. In a preferred embodiment of the invention, nitric acid and acetic acid, whether alone or in admixture, are used.

It is also possible to impregnate the aged alumina agglomerates with an acid solution including compounds which release an anion capable of combining with the aluminum ions in solution, as described in FR 2,496,631.

Thus, exemplary such compounds are those comprising a nitrate, chloride, sulfate, perchlorate, chloroacetate, dichloroacetate, trichloroacetate, bromoacetate, or dibromoacetate anion, as well as the anions of the general formula:

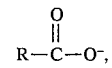

such as the formates, acetates, citrates, etc.

The agglomerates treated in this manner are then dried at a temperature generally ranging from about 100° to 200° C. for a period of time sufficient to remove the water not bonded chemically to the alumina. The agglomerates thus treated are then subjected to thermal activation at a temperature of from about 400° to 1,100° C. for a period of time ranging from approximately 15 min to 2 hours.

The activation temperature is selected as a function of the intended use of the agglomerates. Thus, for use in the field of catalysis for the treatment (or catalytic conversion) of the exhaust gas from internal combustion engines, activation temperatures ranging from approximately 600° to 1,000° C. are preferably employed.

The active alumina starting material according to the invention is typically produced by the rapid dehydration of aluminum hydroxides, such as bayerite, hydrargillite or gibbsite, nordstrandite or aluminum oxyhydroxides, such as boehmite or diaspore.

This dehydration is carried out utilizing a flowstream of hot gases, thus making it possible to very rapidly entrain and eliminate the water evaporated. The temperature of the gases in the apparatus generally range from 400° to 1,200° C., with a contact time of the hydroxide with the hot gases on the order of a fraction of a second to 4 to 5 sec.

The alumina produced in this manner may be used as such, after subjecting it to a treatment to eliminate, in particular, any alkaline material present.

The specific surface, measured by the BET method, of the activated alumina produced by the rapid dehydration of aluminum hydroxides or oxyhydroxides typically ranges from 50 to 400 m²/g, with the particle diameters typically ranging from 0.1 to 300 microns, preferably from 1 to 120 microns.

This alumina has a pore volume on the order of 0.10 to 0.50 cm³/g, the pores having dimensions less than 500 Å.

In another preferred embodiment of the invention, the active alumina is produced by the rapid dehydration of Bayer hydrate (hydrargillite), which is a readily available and inexpensive industrial aluminum hydroxide. An active aluminum of this type is well known to this art and is described, in particular, in FR 1,108,011.

The agglomeration of the active alumina is carried out using techniques which are also well known to this art, for example by tabletting, extrusion, pelleting in a rotating pelleting machine, and the like.

This agglomeration may be carried out on the active alumina such as produced by dehydration and treated subsequently, or on an active alumina ground to one or more predetermined grain size distributions.

As indicated above, the porogenic agents may be added to the active alumina prior to or during the agglomeration.

The resulting agglomerates have, for example, diameters ranging from about 2 to 5 mm and an ignition weight loss on the order of 50%.

The ignition weight loss, or IWL, is defined as the percentage of loss by weight after calcination for 2 hours at 1,000° C.

The agglomerates produced according to the invention, after autoclaving and drying, consist essentially of alumina and boehmite. The weight proportion of the boehmite is less than 60%. Furthermore, the boehmite crystallites have small dimensions, on the order of 100 Å as the mean diameter, and less than 120 Å.

The presence of small boehmite crystallites is a truly unexpected result. In effect, such product has improved thermal stability.

In order to further illustrate the present invention and the advantages thereof, the following specific examples are given, it being understood that same are intended only as illustrative and in nowise limitative.

EXAMPLE 1

Active alumina obtained by the rapid dehydration of hydrargillite was ground, for example with a ball grinder, to produce a powder having a mean diameter of 7 μm (100% of the particles had a diameter less than 96 μm).

This powder had a specific surface of 370 m$^2$/g, with a total pore volume of 30 cm$^3$/100 g, the pores having dimensions of less than 500 Å. The sodium content of the alumina, expressed as Na$_2$O, was 800 ppm.

This alumina was admixed with wood flour as the porogenic agent (15% by weight), then formed in a granulator or pelleting machine. Water was added to permit such molding process.

The agglomerates or pellets of the alumina thus produced had diameters ranging from 2 to 5 mm and an ignition weight loss of about 50%.

The pellets were subjected to an aging stage in a flow of steam at 100° C. for 24 hours. The resulting pellets had an ignition weight loss of approximately 48%, contained about 20% boehmite, and displayed the pore distribution shown in FIG. 1, curve A.

The pellets were immersed in an aqueous solution of acetic acid, at a concentration of 50 g/l, for about 5 hours. The pellets were thus saturated with acid.

The pellets were removed from the solution and optionally drained. They were then placed into an autoclave for approximately 2 hours, at a temperature of 210° C. under a pressure of 20.5 bar.

Upon their removal from the autoclave, the pellets were dried for 4 hours at 100° C.

X-ray spectrographic analysis showed that the pellets contained 50% boehmite with crystallites of a diameter of 95 Å.

After calcination for 2 hours at 900° C., the pellets had the following characteristics:

(i) Specific surface: 108 m$^2$/g; after aging at 982° C. for 24 hours: 32 m$^2$/g;

(ii) Grain density: 0.86:

(iii) Total fill density: 0.54 kg/l;

(iv) Pore distribution (measured by the mercury method):

pore volume for pores of $\phi$>10,000 Å: 0.172 cm$^3$/g;

$\phi$>1,000 Å: 0.319 cm$^3$/g;

$\phi$>100 Å: 0.826 cm$^3$/g;

total pore volume: 0.841 cm$^3$/g.

The pore distribution is illustrated in FIG. 1, curve B ($\phi$=diameter).

COMPARATIVE EXAMPLE 2

The procedure of Example 1 was repeated, except that the aged pellets were activated and calcined prior to aging.

The pellets obtained prior to aging had the following characteristics:

(i) Specific surface: 233 m$^2$/g;

(ii) Grain density: 0.80;

(iii) Pore distribution (measured by the mercury method):

pore volume for pores of $\phi$>10,000 Å: 0.35 cm$^3$/g;

$\phi$>1,000 Å: 0.415 cm$^3$/g;

total pore volume: 0.956 cm$^3$/g.

Figure 2:
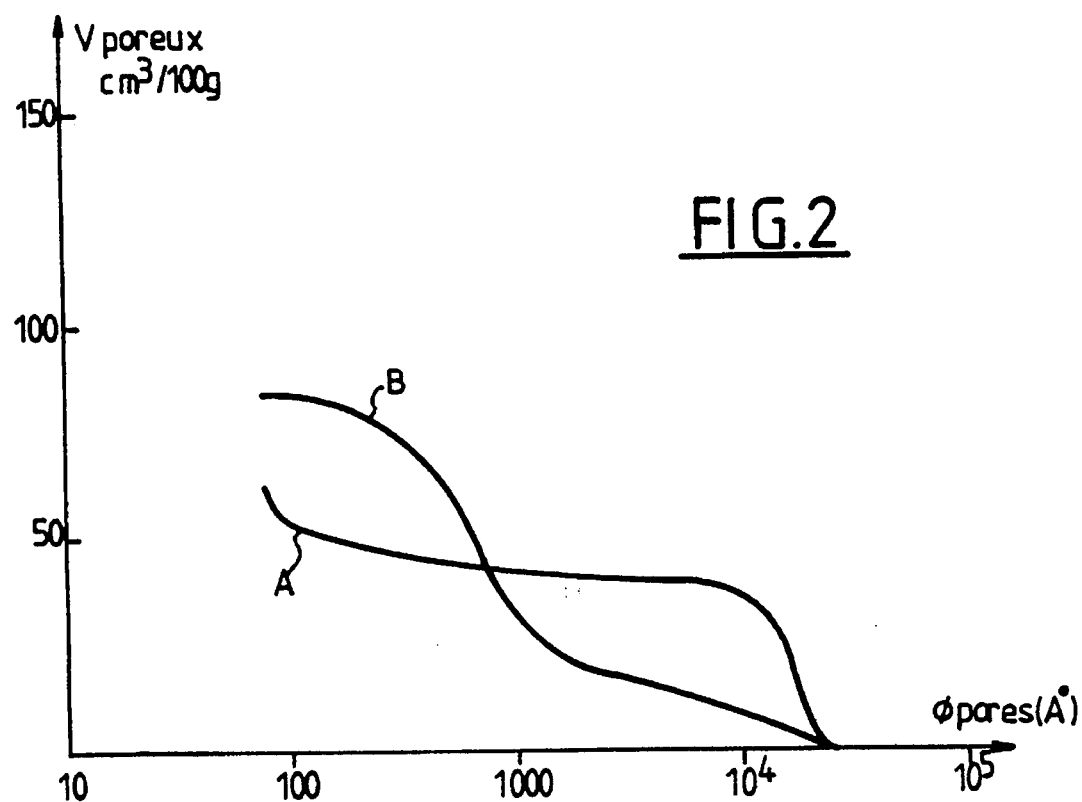
FIG. 2 is a like graph, but of the alumina of Example 2.

The pore distribution is shown in FIG. 2, curve A.

The mean diameter of these pellets was equal to approximately 3.15 mm and they were subjected to a hydrothermal treatment identical with that described in Example 1, then dried and calcined.

After autoclaving, the proportion of boehmite was determined to be 45% and the mean diameter of the crystallites was 150 Å.

After drying and calcination at 900° C., the pellets had the following characteristics:

(i) Specific surface: 105 m$^2$/g; after aging for 24 hours at 982° C.: 46 m$^2$/g;

(ii) Grain density: 0.78;

(iii) Crush strength: 2.2 daN (iv) Total pore volume: 1 cm$^3$/g;

(v) Pore volume for pores of $\phi$>10,000 Å: 0.004 cm$^3$/g;

$\phi$>1,000 Å: 0.23 cm$^3$/g.

The pore volume distribution as a function of pore diameter is shown in FIG. 2, curve B.

The above examples clearly show that it is not possible to utilize the process of the prior art and retain the pore distribution in the aluminum pellets as they existed prior to the hydrotreatment.

EXAMPLE 3

Active alumina was produced by the process described in Example 1, except that it had a higher sodium content, and was ground to produce a powder having a mean particle diameter of 12.9 μm.

This powder had a specific surface of 300 m$^2$/g and a total pore volume of 25 cm$^3$/g, the pores having a diameter of less than 500 Å. It contained 2,800 ppm sodium oxide (expressed as Na$_2$O) and had not been treated to reduce the sodium content.

As in Example 1, the alumina was mixed with wood flour as the porogenic agent (15% by weight), then molded in a pelleting machine.

The alumina agglomerates had a diameter ranging from 2 to 4 mm, with an ignition weight loss of 48.9%, and the following pore distribution:

Pore volume $\phi$>10,000 Å: 0.1 cm$^3$/g;

$\phi$>1,000 Å: 0.3 cm$^3$/g.

After aging for 12 hours at 100° C., the pellets had an ignition weight loss of 46.4% and a proportion of boehmite of approximately 21%.

As in Example 1, the pellets were immersed in a solution of acetic acid at a concentration of 50 g/l, for about 5 hours.

The pellets were then subjected to a hydrothermal or autoclave treatment, optionally after draining, for approximately 2 hours, at 210° C. under 20.5 bar.

The pellets recovered contained 40% boehmite and a $Na_2O$ content of 890 ppm, with an ignition weight loss of 38.7%.

The boehmite crystallites had a mean diameter of 98 Å.

The pellets were then drained and calcined at 900° C. for 2 hours.

The resulting final product had the following characteristics:

(i) Specific surface: 126 m²/g; after aging at 982° C. for 24 hours: 53 m²/g;

(ii) Grain density: 0.87;

(iii) EGG (resistance to grain crushing): 3.8 daN; after aging at 982° C. for 24 hours: 2.6 daN;

(iv) Attrition resistance (AIF): 98.4%; after aging at 982° C. for 24 hours: 96%;

(v) Total pore volume: 0.867 cm³/g;

for pores of $\phi$>10,000 Å: 0.06 cm³/g;

$\phi$>1,000 Å: 0.28 cm³/g;

$\phi$>100 Å: 0.75 cm³/g.

This example again shows that the distribution of the pores obtained after aging was essentially maintained during autoclaving and calcination.

Another unexpected feature of the process of the invention is the elimination of every large fraction of the sodium contained in the alumina, such sodium values typically being undesirable for different applications of the alumina, especially when used as a catalyst support.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of alumina agglomerates, comprising steps of (a) forming agglomerates by agglomerating an alumina powder, the alumina powder having been produced by rapidly dehydrating an aluminum hydroxide, (b) forming aged agglomerates by aging the agglomerates in a humid atmosphere until a boehmite phase is developed in the agglomerates, (c) forming impregnated agglomerates by impregnating the aged agglomerates with a solution of at least one acid, (d) forming hydrothermally treated agglomerates by hydrothermal treatment of the impregnated agglomerates in an autoclave without subjecting the agglomerates to reactivation between steps (b) and (c), and then (e) drying and calcining the hydrothermally treated agglomerates to produce calcined alumina agglomerates.

2. The process as defined by claim 1, said step (a) further comprising drying the agglomerates thus formed at a temperature of less than 200° C.

3. The process as defined by claim 1, further comprising adding a porogenic compound to said alumina powder either prior to or during the agglomeration step (a).

4. The process as defined by claim 3, comprising adding up to 25% by weight of said porogenic compound, based on the weight of the alumina powder, to produce calcined alumina agglomerates having a macropore volume on the order of 0.10 to 0.80 cm³/g.

5. The process as defined by claim 1, said solution of at least one acid comprising nitric, hydrochloric, perchloric or sulfuric acid.

6. The process as defined by claim 1, said solution of at least one acid having a pH of less than 4 and comprising a weak acid.

7. The process as defined by claim 6, said weak acid comprising acetic acid.

8. The process as defined by claim 1, said solution of at least one acid further comprising an anion capable of chemically combining with aluminum ions.

9. The process as defined by claim 8, said anion comprising a nitrate, chloride, sulfate, perchlorate, chloroacetate, dichloroacetate, trichloroacetate, bromoacetate or dibromoacetate.

10. The process as defined by claim 8, said anion comprising a formate, acetate or citrate.

11. The process as defined by claim 1, comprising conducting said aging step (b) at a temperature of from 30° to 100° C.

12. The process as defined by claim 1, comprising conducting said hydrothermal treatment (d) at a temperature of more than 80° C.

13. The process as defined by claim 12, said temperature of hydrothermal treatment ranging from 150° to 250° C.

14. The process as defined by claim 1, wherein uncalcined alumina agglomerates produced in step (d) have a proportion of boehmite of less than 60%, with the boehmite crystallites having a mean diameter of less than 120 Å.

15. The process as defined by claim 1, wherein calcined alumina agglomerates produced in step (e) have a bimodal pore distribution comprising a macroporous fraction, wherein the macropores have diameters greater than 1,000 Å, and a micro-porous fraction, wherein the micropores have diameters ranging from 50 Å to 1,000 Å.

16. The process as defined by claim 1, comprising calcining the hydrothermally treated agglomerates at a temperature of from 400° to 1,000° C.

17. The process as defined by claim 1, said aluminum hydroxide comprising bayerite, hydrargillite, gibbsite, nordstrandite, an aluminum oxyhydroxide, or diaspore.

* * * * *